United States Patent
Höhne et al.

[11] 3,940,510
[45] Feb. 24, 1976

[54] PROCESS FOR THE MANUFACTURE OF SILVER-COATED TUNGSTEN CARBIDE ELECTRODE MATERIAL

[75] Inventors: Karl Höhne, Erlangen; Konrad Mund, Erlangen-Sieglitzhof, both of Germany

[73] Assignee: Siemens Aktiengesellschaft, Munich, Germany

[22] Filed: Sept. 6, 1973

[21] Appl. No.: 394,772

[30] Foreign Application Priority Data
Sept. 12, 1972 Germany.............................. 2244701

[52] U.S. Cl. ................. 427/115; 427/125; 427/217; 136/120 FC; 204/290 R; 204/290 F
[51] Int. Cl.² ...................... B08B 3/00; C25B 11/00
[58] Field of Search .................. 117/100 B, 227, 27; 204/290 R, 290 F; 427/217, 125, 115; 106/1; 136/120 FC

[56] References Cited
UNITED STATES PATENTS

| | | |
|---|---|---|
| 3,372,066 | 3/1968 | Quass............................... 117/100 B |
| 3,380,856 | 4/1968 | Pohl............................... 136/120 FC |
| 3,404,034 | 10/1968 | Maurer............................. 117/100 B |
| 3,479,276 | 11/1969 | Jung et al......................... 204/290 R |
| 3,535,149 | 10/1970 | Dunn et al. ....................... 117/227 |
| 3,553,032 | 1/1971 | Baba............................... 136/120 FC |
| 3,617,101 | 11/1970 | Anderson .......................... 204/290 F |
| 3,681,146 | 8/1972 | Baba............................... 136/120 FC |
| 3,684,579 | 8/1972 | Mund et al. ....................... 136/120 FC |
| 3,770,613 | 11/1973 | Chisholm .......................... 204/290 R |

FOREIGN PATENTS OR APPLICATIONS

| | | | |
|---|---|---|---|
| 6,509,997 | 8/1965 | Netherlands.................. | 136/120 FC |

*Primary Examiner*—Michael F. Esposito
*Attorney, Agent, or Firm*—Kenyon & Kenyon Reilly Carr & Chapin

[57] ABSTRACT

The invention concerns a method for the manufacture of an electrode material containing silver-coated tungsten carbide for electrochemical cells, particularly fuel cells and storage cells. Silver is precipitated on finely-divided tungsten carbide particles by reduction of a silver salt, and the tungsten carbide particles are thereby joined to form particles of larger grain size.

9 Claims, 1 Drawing Figure

Fig. 1

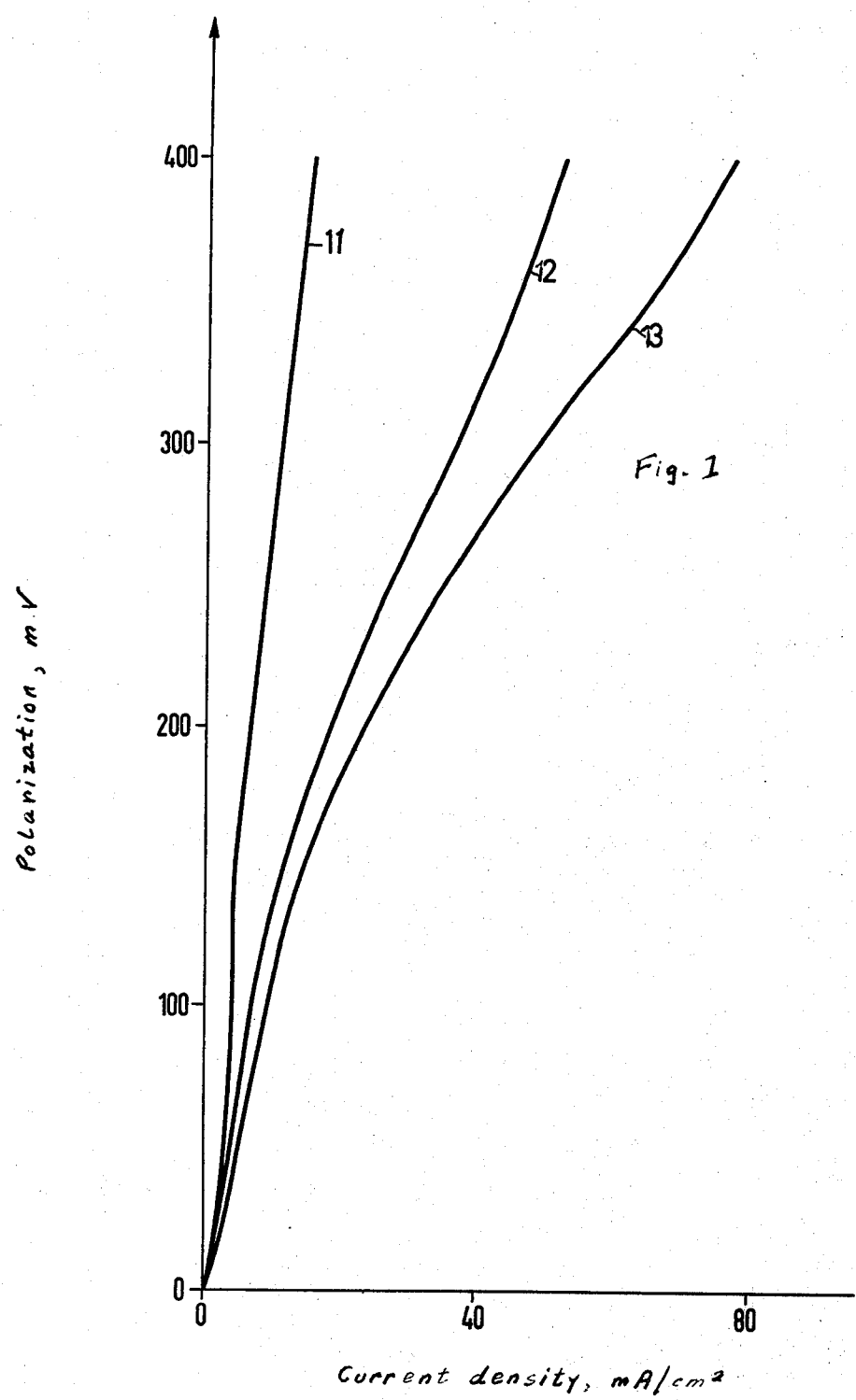

PROCESS FOR THE MANUFACTURE OF SILVER-COATED TUNGSTEN CARBIDE ELECTRODE MATERIAL

This invention relates to a process for the manufacture of an electrode material containing silver and tungsten carbide for electrochemical cells, particularly fuel cells and storage cells.

It is known to employ tungsten carbide as a catalyst for the anodic oxidation of fuels, for instance, hydrogen, in fuel cells with an acidic electrolyte. Tungsten carbide may be made, for instance, by carburizing metallic tungsten with carbon, carbon black, or carbon-containing gases, such as carbon monoxide and methane, at temperatures above about 700°C. For the manufacture of bonded gas electrodes, tungsten carbide powder may be mixed with polymers as binders and pore-forming agents or with porous additives, such as activated carbon, and can be cold or hot molded (see "Energy Conversion", Vol. 10, pp. 25–28 (1970)).

Difficulties are encountered in the manufacture of unbonded electrodes which contain the electrode or catalytic material in powder form. In the preparation of tungsten carbide from tungstic acid by reduction with hydrogen and carburation with carbon monoxide, for instance, the tungsten carbide thereby obtained has a mean particle size of less than about 1 micron; particles of larger diameter have too little surface area for electrode purposes in electrochemical cells. Employing particles of small diameter in powder electrodes leads to various difficulties. For one, the application of electrical contacts is a problem, as a conducting screen or fabric which is gas-permeable cannot be made economically and furthermore has pores so fine that the catalyst particles cannot get through the fabric into the gas chamber. On the other hand, the diameter of the pores (interstices) which form between the particles, depends on the size of the particles. Narrow pores between small particles develop high capillary pressures if they are filled with liquid, and the presence of a three-phase boundary can be created only by the use of very high gas pressures.

These difficulties are not present in bonded electrodes, because during the manufacture of such electrodes transport pores can be produced, by the introduction of pore-forming agents according to known methods, which are filled with gas even at low gas pressures and thereby readily permit the transport of the reaction gas to the point of the reaction. The use of organic binders, however, can have a detrimental effect, particularly in high-performance electrodes, since the binders have insulating properties and thereby impede the conduction of the current, and exclude a portion of the particles entirely from the conduction of the current, and hence from participation in the electrochemical process.

German Offenlegungsschrift No. 1,939,127 describes a method for the manufacture of an electrode containing tungsten carbide for fuel cells in which the fine tungsten carbide particles are held together by silver, so that particles with a larger diameter are produced. For preparing the catalytic material, the silver salt of a tungstic acid, preferably silver metatungstate, is reduced and carburized at elevated temperature, whereby silver-containing tungsten carbide (Ag-WC) particles are formed. Such particles have a grain diameter approximately in the range of between about 10 and about 80 microns. The electrode material is distinguished by a high load capacity due to its advantageous structure; in addition to the diameter of the particles, which is well-suited for use in powder electrodes, the electrode material has a sufficiently large surface area, approximately in the range of 5 $m^2/g$ (as determined by the BET method). In manufacturing larger quantities of electrode material, however, it is difficult to obtain uniform reproducibility which is particularly observable in the electrochemical properties of the product electrode.

It is an object of the invention to provide a simplified and further improved method for the manufacture of an electrode material containing silver and tungsten carbide for electrochemical cells, particularly fuel cells and storage cells. In addition, an electrode material having greater activity is obtained.

The electrode material prepared in accordance with the invention, which contains silver and tungsten carbide, exhibits a uniformly high electrochemical activity, and the reproducibility of the method is therefore established. In addition, the catalytic activity is increased over that of the electrode material prepared according to the above-described method; this can be observed, for instance, from the current-voltage characteristics of the electrode materials. Furthermore, the silver content in the end product may be varied within wide limits, whereas compared to the above-described method a reduction in silver content is particularly important, mainly for reasons of economy. Finally through the use of tungsten carbide as the starting material, it is also possible to conduct an intermediate check regarding the electrochemical activity of the product electrode material by determining the activity of the tungsten carbide so used.

Broadly stated, the process comprises forming a suspension of finely-divided particles of tungsten carbide in an alkaline liquid, adding to said suspension a reducing agent capable of reducing silver ions in alkaline medium and also a silver salt, and thereafter separating from said suspension silver-coated tungsten carbide particles.

In a particularly preferred embodiment of the process, a suspension of tungsten carbide particles having a mean grain size of less than about 1 micron is suspended in an aqueous solution of potassium hydroxide. To this suspension and while it is being vigorously agitated, a mixture of formaldehyde and an aqueous solution of silver nitrate is slowly added, preferably dropwise. The amount of silver in such solution is preferably sufficient to provide in the range of from about 10 to 20 weight percent metallic silver on the tungsten carbide particles. After completion of the reaction, the precipitate is separated from the supernatant liquid, washed and dried, from which one obtains silver-coated tungsten carbide particles in the range of 10 to about 80 microns. Further details of the process are explained in the following paragraphs.

For the reduction of the silver salt, formaldehyde may be advantageously employed, particularly as an aqueous solution (formalin). The best results are obtained with formaldehyde as the reducing agent. The reduction also may be performed, however, in a known manner with other reducing agents, such as hydrazine or hydroxylamine.

Silver nitrate is preferably employed as the silver salt, but other soluble silver salts may be employed, for instance, silver acetate or silver fluoride. It is preferred to employ a weakly acidic aqueous solution of the silver salt. This avoids premature reduction of the silver, which occurs only in an alkaline environment. For this purpose the formaldehyde-silver nitrate solution is added slowly, e.g., dropwise to an alkaline suspension of tungsten carbide. Alternatively, the reducing agent and the silver salt solution may be added separately but concurrently to the suspension. The alkaline suspension is advantageously vigorously mixed during the addition of the silver salt solution and the reducing agent, because an electrode material with particularly high activity is thereby obtained. The reaction mixture may be cooled to dissipate the heat of reaction and to maintain the suspension at or below room temperature. The suspension may be made alkaline with a hydroxide, such as potassium or sodium hydroxide. In the process, the silver precipitates on the suspended tungsten carbide in the form of a gray-black deposit having a large surface area.

The ratio of silver to tungsten carbide in the finished electrode material may be varied within wide limits. Advantageously, however, the tungsten carbide and the silver salt are employed in such amounts that the silver content in the end product is about 10 to 20% by weight, and preferably about 15% by weight. An electrode material with a silver content in such range exhibits very good electro-catalytic properties. The electrode material has a grain size approximtely in the range of between about 10 and about 80 microns.

The invention will be explained in further detail with reference to an example of an embodiment and FIG. 1, which figure illustrates current-voltage characteristics of electrodes containing electrode material prepared in accordance with the invention.

Tungsten carbide is prepared as follows. 250 G of tungstic acid ($H_2WO_4$) in powder form are reduced in a tube furnace in hydrogen flowing at approximately 100 liters/hour. The reduction takes place first at 540°C for 3 hours and subsequently at about 700°C for 2 hours. After the reduction is completed, the temperature is raised to about 860°C and the hydrogen is replaced by carbon monoxide flowing at about 200 liters/hour. The carburation is complete after about 4 hours. One obtains about 190 g of tungsten carbide with a mean grain size of less than 1 micron. In order to avoid oxidation (the tungsten carbide can be present as a pyrophorous powder), the material, which is cooled under a carbon monoxide atmosphere, can be suspended immediately in water. The tungsten carbide prepared in this manner is fabricated into a so-called supported electrode having a coating thickness of 20 mg/cm$^2$. In a standard half-cell operated at room temperature (about 22°C) with a hydrogen pressure of 30 N/cm$^2$, a 2.5 m $H_2SO_4$ electrolyte and a polarization of 200 mV, the current yield is 0.25 A/gram of electrode material and the current density is 5 mA/cm$^2$.

Electrode material containing silver and tungsten carbide is prepared as follows. A suspension is made of 100 g of tungsten carbide in 140 ml of 6 n KOH. A mixture of 34 g $AgNO_3$ in 200 ml of water and 40 ml of an aqueous 35% formaldehyde solution (formalin) is added slowly, dropwise, to such suspension over the course of about 1 hour. While adding the drops, the reaction mixture is stirred vigorously and the reaction temperature is held between about 15° and 20°C by cooling with ice. After the reduction of silver is complete, the precipitate formed is allowed to settle and the supernatant clear liquid is decanted.

The precipitate is washed with water until the wash water reacts neutral. Then the residual water is removed under suction, the moist material is suspended in methanol and the methanol is decanted. Subsequently, the electrode material obtained is dried for about 2 hours in a drying cabinet at a temperature of about 110°C, whereby a finely-divided gray-black powder is obtained.

The electrode material prepared in this manner, having a grain size in the range between about 10 and 80 microns, is fabricated into a supported electrode having an electrode area of 12.5 cm$^2$. To this end, sufficient electrode material is deposited on a layer of asbestos paper, which may contain a binder, to furnish a coating of about 200 mg/cm$^2$. The coating of electrode material is covered on the gas side with a carbon fabric which supports the coating and serves to make electrical contact. On the electrolyte side, the asbestos layer is supported by a perforated tantalum sheet.

The catalytic activity of such an electrode was tested in a half-cell arrangement, a gold sheet serving as the counterelectrode. An electrolyte of 2.5 m $H_2SO_4$ at a temperature of 22°C was used as the electrolyte liquid; hydrogen at different operating pressures served as the reaction gas. An $Hg/Hg_2SO_4$ electrode in the same electrolyte was used as the reference electrode.

The results obtained in the investigations are depicted in FIG. 1 as current-voltage characteristics, current density in mA/cm$^2$ versus the polarization ($\eta$) in mV, measured against the $Hg/Hg_2SO_4$ reference electrode. The characteristics were obtained on electrodes with a coating thickness of 200 mg/cm$^2$. Curve 11 was recorded at a hydrogen pressure of 15 N/cm$^2$; curves 12 and 13 at a hydrogen pressure of 20 and 25 N/cm$^2$, respectively.

As may be seen from curve 12, a current density of about 23 mA/cm$^2$ is obtained with the electrode material prepared in accordance with the invention, with a coating of 200 mg/cm$^2$ and an operating pressure of 20 N/cm$^2$ and with a polarization of 200 mV; from this, the calculated current yield is about 0.11 ampere per gram of catalytically active electrode material. Referred to tungsten carbide alone, the current yield is even greater, since the catalytic material contains silver. An important advantage of the electrode material prepared in accordance with the invention, as compared to pure tungsten carbide, is that electrodes made with it attain their optimum performance characteristic at lower hydrogen pressures; with pure tungsten carbide, an operating pressure of about 30 N/cm$^2$ is required.

The attainable current density increases with increasing operating pressure. With a polarization of 200 mV, the current density is about 29 mA/cm$^2$ (curve 13) at a hydrogen pressure of 25 N/cm$^2$. With a hydrogen pressure of 15 N/cm$^2$, on the other hand, the current density attainable with the same polarization in only about 8 mA/cm$^2$ (curve 11).

In addition to fuel cells and storage cells, the electrode material prepared in accordance with the invention may also be employed in other electrochemical cells, particularly for electro-synthesis and electrolysis. If used in storage cells, the electro-catalyst prepared in accordance with the invention is particularly useful as the electrode material in the indicator and consumable electrodes in gastight storage cells, because in such cells provision must be made for preventing the gases which may be generated due to overcharging, and are generated during discharging, from exerting an excessively high pressure. In order to achieve this, the capacity of the positive electrode is, for instance, selected to be larger than that of the negative electrode, so that in case of overcharging, hydrogen develops first at the negative electrode ($2 H_2O + 2 e^- \rightarrow H_2 + 2 OH^-$). In principle, two means of prevention are known. First, a so-called consumable electrode may be incorporated into the storage cell, at which the hydrogen which may be generated is electrochemically reacted and is brought into solution again. Secondly, the storage cell may comprise a so-called indicator electrode which is catalytically active and sets up the reversible hydrogen potential under the action of hydrogen. This potential, which is measured against a reference electrode, may then by used as a control signal to terminate the charging process. The electrode material prepared in accordance with the invention can be used for both kinds of the auxiliary electrodes mentioned, i.e., the consumable electrodes and the indicator electrodes.

Having thus described the invention, what is claimed is:

1. A process for preparing silver-coated tungsten carbide particles adapted for use in manufacturing electrodes for fuel cells, which process comprises forming a suspension of finely divided particles of tungsten carbide in an alkaline solution, adding to said suspension a reducing agent capable of reducing silver ions in alkaline medium and also a silver salt soluble in said solution, the amounts of tungsten carbide and silver salt employed being sufficient to provide a silver content of approximately 10 to 20% by weight of said silver-coated tungsten carbide particles, and thereafter separating from said suspension silver-coated tungsten carbide particles.

2. A process according to claim 1, wherein said silver salt and said reducing agent are mixed together in solution prior to being added to said suspension.

3. The process according to claim 1, wherein said reducing agent is formaldehyde.

4. The process according to claim 1, wherein said silver salt is silver nitrate.

5. The process according to claim 2 wherein said solution of silver salt and reducing agent is an aqueous or weakly acid solution.

6. The process according to claim 1, wherein said suspension is vigorously agitated during the addition thereto of said silver salt and said reducing agent.

7. The process according to claim 1, wherein said fine-grained tungsten carbide particles have a mean grain size of less than about 1 micron.

8. The process according to claim 1 wherein the amount of tungsten carbide and silver salt employed is an amount sufficient to provide a silver content of approximately 15% by weight in said silver-coated tungsten carbide particles.

9. The process according to claim 1 in which said alkaline solution is one of the group consisting of potassium hydroxide and sodium hydroxide.

* * * * *